US008704132B2

(12) United States Patent
Artelsmair et al.

(10) Patent No.: US 8,704,132 B2
(45) Date of Patent: Apr. 22, 2014

(54) WELDING WIRE STORAGE DEVICE

(75) Inventors: Josef Artelsmair, Wartberg/Krems (AT); Christian Stumpfl, Taufkirchen (AT)

(73) Assignee: Fronius International GmbH, Pettenbach (AT)

( * ) Notice: Subject to any disclaimer, the term of this patent is extended or adjusted under 35 U.S.C. 154(b) by 1410 days.

(21) Appl. No.: 10/587,153

(22) PCT Filed: Jan. 26, 2005

(86) PCT No.: PCT/AT2005/000019
§ 371 (c)(1),
(2), (4) Date: Jul. 25, 2006

(87) PCT Pub. No.: WO2005/070607
PCT Pub. Date: Aug. 4, 2005

(65) Prior Publication Data
US 2007/0151964 A1    Jul. 5, 2007

(30) Foreign Application Priority Data

Jan. 26, 2004  (AT) .................................. A 93/2004

(51) Int. Cl.
*B23K 9/10*        (2006.01)
(52) U.S. Cl.
USPC .............. 219/137.71; 219/137.2; 219/137.44; 219/121.11; 219/136; 219/137.9; 901/41; 901/42

(58) Field of Classification Search
USPC ............... 219/137.2, 137.44, 137.51, 137.31, 219/121.11, 136, 124.34, 137.63, 145.1, 219/59.1, 60 R, 130.1, 76.15, 137.9; 901/42, 901/41
See application file for complete search history.

(56) References Cited

U.S. PATENT DOCUMENTS

| 3,594,534 A | * | 7/1971 | Benfield ................... 219/125.11 |
| 4,160,151 A | * | 7/1979 | Tonita ......................... 219/137.8 |
| 4,539,465 A | * | 9/1985 | Bosna ......................... 219/137.7 |
| 4,731,518 A | * | 3/1988 | Parmelee et al. ........ 219/137.31 |

(Continued)

FOREIGN PATENT DOCUMENTS

| CA | 2 435 520 | 1/2004 |
| CA | 2435837 | 1/2004 |

(Continued)

OTHER PUBLICATIONS

ATA8302003_A_Translation.pdf; AT412765B_translation.pdf.*

(Continued)

*Primary Examiner* — Dana Ross
*Assistant Examiner* — Ket D Dang
(74) *Attorney, Agent, or Firm* — Collard & Roe, P.C.

(57) ABSTRACT

In a welding wire storage device for a welding system including a housing with a wire core surrounding the welding wire being arcuately arranged to lie freely in a free space of the housing, one end of the wire core is fixed in an end region of the housing and a measuring means is provided to detect the deflection of the wire core. In order to provide a very simple and compact structure for such a welding wire storage device, the wire core is displaceably mounted in a guide element on the opposite end region, and two coupling mechanisms, for connection with a wire guide hose for the wire core are arranged on the housing.

5 Claims, 7 Drawing Sheets

(56) References Cited

U.S. PATENT DOCUMENTS

| | | | | |
|---|---|---|---|---|
| 6,066,833 A | * | 5/2000 | Rigdon et al. | 219/137.2 |
| 8,129,660 B2 | * | 3/2012 | Schorghuber et al. | 219/137.7 |
| 2003/0010753 A1 | * | 1/2003 | Yamada et al. | 219/69.12 |
| 2003/0097128 A1 | * | 5/2003 | Hayzelden | 606/41 |
| 2004/0011776 A1 | * | 1/2004 | Mukai et al. | 219/137.71 |

FOREIGN PATENT DOCUMENTS

| | | | | |
|---|---|---|---|---|
| DE | 38 27 508 | | 2/1990 | |
| DE | 43 20 405 | | 12/1994 | |
| DE | 197 38 785 | | 4/1999 | |
| GB | 2 120 692 | | 12/1983 | |
| SU | 1 489 941 | | 6/1989 | |
| WO | WO 2004105992 A1 | * | 12/2004 | B23K 9/133 |
| WO | WO 2005/002775 | | 1/2005 | |
| WO | WO 2005002775 A1 | * | 1/2005 | B23K 9/133 |

OTHER PUBLICATIONS

Austrian Office Action in Austrian application A 93/2004, dated Jan. 10, 2005 (English translation).

* cited by examiner

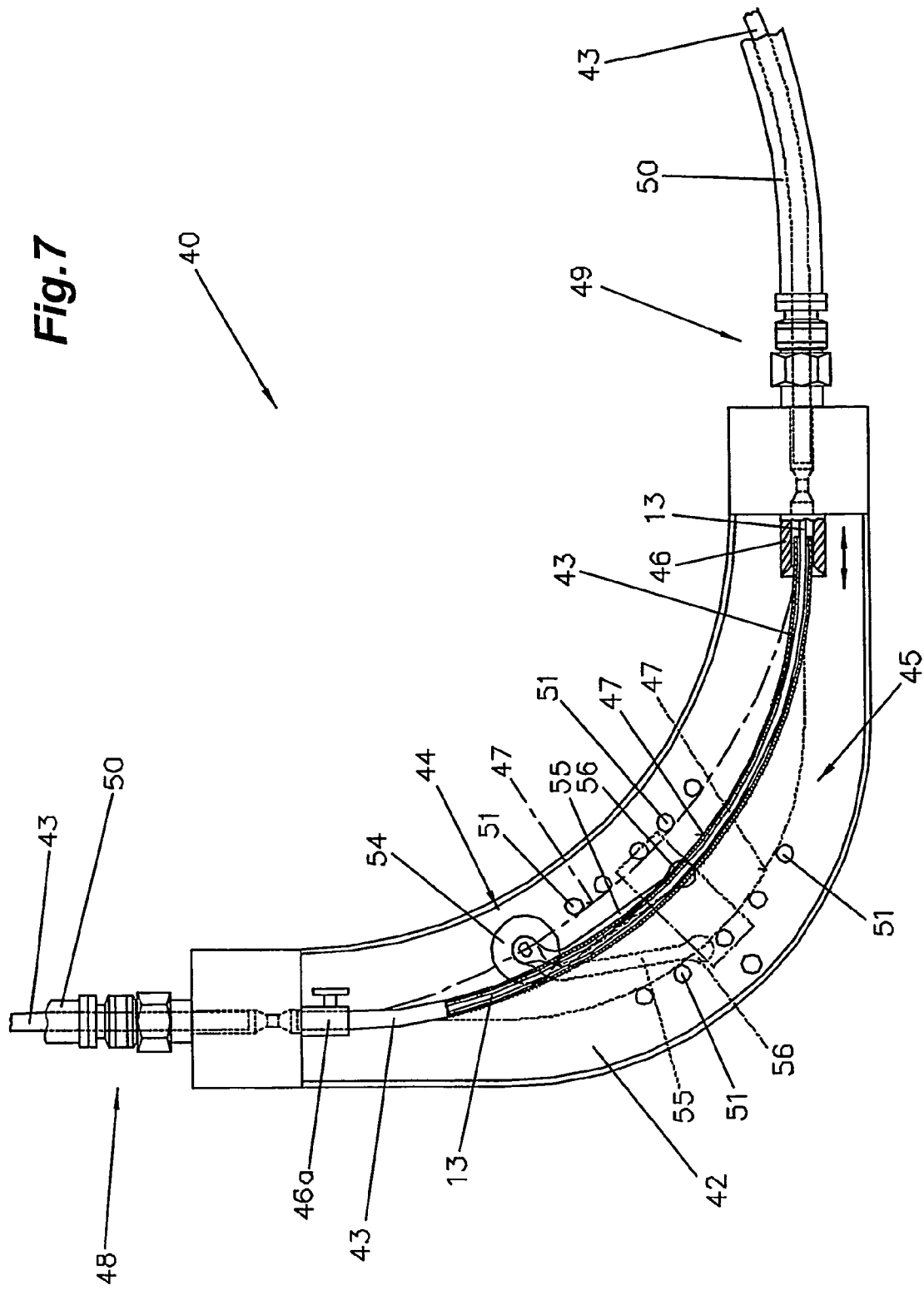

WELDING WIRE STORAGE DEVICE

CROSS REFERENCE TO RELATED APPLICATIONS

Applicants claim priority under 35 U.S.C. §119 of Austrian Application No. A93/2004 filed Jan. 26, 2004. Applicants also claim priority under 35 U.S.C. §365 of PCT/AT2005/000019 filed Jan. 26, 2005. The international application under PCT article 21(2) was not published in English.

The invention relates to a welding wire storage device for a welding system, including a housing with a wire core surrounding the welding wire being arcuately arranged to lie freely in a free space of the housing, wherein one end of the wire core is fixed in an end region of the housing and a measuring means is provided to detect the deflection of the wire core.

The latest welding techniques, in which the welding wire is no longer fed only in one direction at a constant speed, but forward and backward movements or different feeding speeds of the welding wire are realized for the ignition of the electric arc and/or during the welding process, great emphasis is placed on wire feeding. Because of different welding wire speeds and/or feeding directions of the welding wire, current wire feed systems involve the problem of the welding wire feed response behavior being rather sluggish, thus preventing the achievement of optimum welding results. This is due to the fact that an excess of welding wire will temporarily be present in the wire feed system because of different feeding speeds, or at a change in the feeding direction of the welding wire within the wire feed system, which excess wire, according to the prior art, has to be returned to the wire coil over the entire hose pack.

From DE 197 38 785 C2, a device for electric-arc welding using a consumable electrode is, for instance, known, in which the welding wire is supplied to the welding site from a feed drum via two wire feeds. There is described a short-circuit welding process in which the welding wire feed performs a droplet transfer-supporting movement prior to the completion of the droplet formation. At the occurrence of a short-circuit, the welding wire is pulled back by the wire feeder and subsequently is again moved forwards after having reached a predetermined distance, wherein the welding wire is transported in a wire buffer. However, nothing can be taken from that document as to the configuration and exact arrangement of the wire buffer.

From DE 38 27 508 A1, a transport device is known, by which the welding wire is fed at a constant force even at unfavorable force introductions, while avoiding tensile and compressive stresses. The welding wire is guided through an evading part and a curved hose, between a push wire feeder arranged within the welding apparatus or in a wire feeding means, and a pull wire feeder preferably arranged in the region of the welding torch or within the welding torch itself. The hose tension is supported by a spring. The evadable part is coupled with a control organ measuring the evasion path of the evading part at the occurrence of compressive or tensile stresses on the welding wire and supplying the same to a control system for compensation via an automatic speed control of the first drive. In that solution, an appropriate force for feeding the welding wire is adjusted on account of the arrangement of the spring.

A wire puffer configuration is known from DE 43 20 405 C2, which describes a device for the slip-free feeding of a welding wire. There, a wire buffer is again formed between two wire feeders and configured in a manner that the welding wire forms a complete wire loop before being introduced into the hose pack. The wire buffer is, thus, formed by a loop between two spaced-apart plates whose mutual distance is larger than the diameter of the welding wire. A sensor detecting the diameter of the loop of the welding wire is arranged to monitor the filling level of the wire buffer.

SU 1489941 describes a wire buffer formed by a loop, wherein the welding wire extends within a wire core made of polyamide, which is fixed on one end and freely movable on its other end. The wire core is arranged between two current-carrying plates which are each interrupted by a specially configured groove. The position of the wire core influences the capacitance between the plates, from which the filling level of the wire storage can be concluded. The trailing arrangement of the wire core between the plates causes friction losses adversely affecting the response behavior of the wire buffer. Finally, the end of the wire core on which the welding wire emerges is unguided, thus rendering the automatic threading in of the welding wire difficult.

The above-described systems involve the disadvantage of requiring a lot of space for this type of wire buffer, thus allowing its reasonable application only in the region of the welding apparatus or wire feeder, or as a separate device. It is, therefore, necessary to convey the welding wire from the wire buffer over the entire hose pack to the welding torch and again back to the wire buffer, so that large friction losses will occur and the wire feed response behavior will not be substantially improved. Such friction losses and the great sluggishness of the wire feed are caused by the fact that with the known wire feeding techniques the welding wire extends in a wire core which is inserted in a guiding tube, preferably in the hose pack, with the inner diameter of the guide hose being only negligibly larger than the outer diameter of the wire core. Thus, the precise guidance of the wire core is ensured, yet it is necessary for the welding wire, for instance at a reversal of the feeding direction, to be pushed back into the wire buffer over the entire length of the wire core, i.e., the hose pack.

The object of the present invention, therefore, consists in furnishing a welding wire storage device for a welding system, which provides a very simple and compact structure.

The object according to the invention is achieved in that the wire core is displaceably mounted in a guide element on the opposite end region, and that two coupling mechanisms for connection with a wire guide hose for the wire core are arranged on the housing. This offers the advantage that the structural height of the welding wire storage device is only negligibly larger than the diameter of the hose pack so as to enable the welding wire storage device to be arranged as closely to the welding process as possible without affecting accessibility and movability. The compact mode of construction enables the welding wire storage device to be placed or installed in virtually any position of the welding wire feed, which is facilitated by the coupling mechanisms. Another advantage resides in that the welding wire, despite the arrangement of a welding wire storage device, extends within the wire core almost completely over the total length of the wire feed so as to allow safe feeding without any major risk of buckling. Hence, the use of soft welding wires, for instance aluminum wires, is feasible. An essential advantage consists in that, due to the slight deflection of the welding wire, i.e., the slightly arcuate extension of the welding wire, the automatic threading in of the welding wire is feasible. Automatic threading-in is even further enhanced in that the wire core, in the welding wire feeding direction, is at first inserted in the fixed portion of the wire core. Moreover, the hose pack can be fixed to the welding wire storage device, thus enabling the hose pack and the welding wire storage device to be simultaneously fastened, for instance, to a balance beam.

Further configurations are also described herein. The resulting advantages can be taken from the specification.

The present invention will be described with reference to the accompanying drawings, which show exemplary embodiments of the welding torch. Therein:

FIG. 7 in a simplified schematic illustration shows an exemplary embodiment of an angular storage with a wire core specifically arranged therein.

Figure 1:
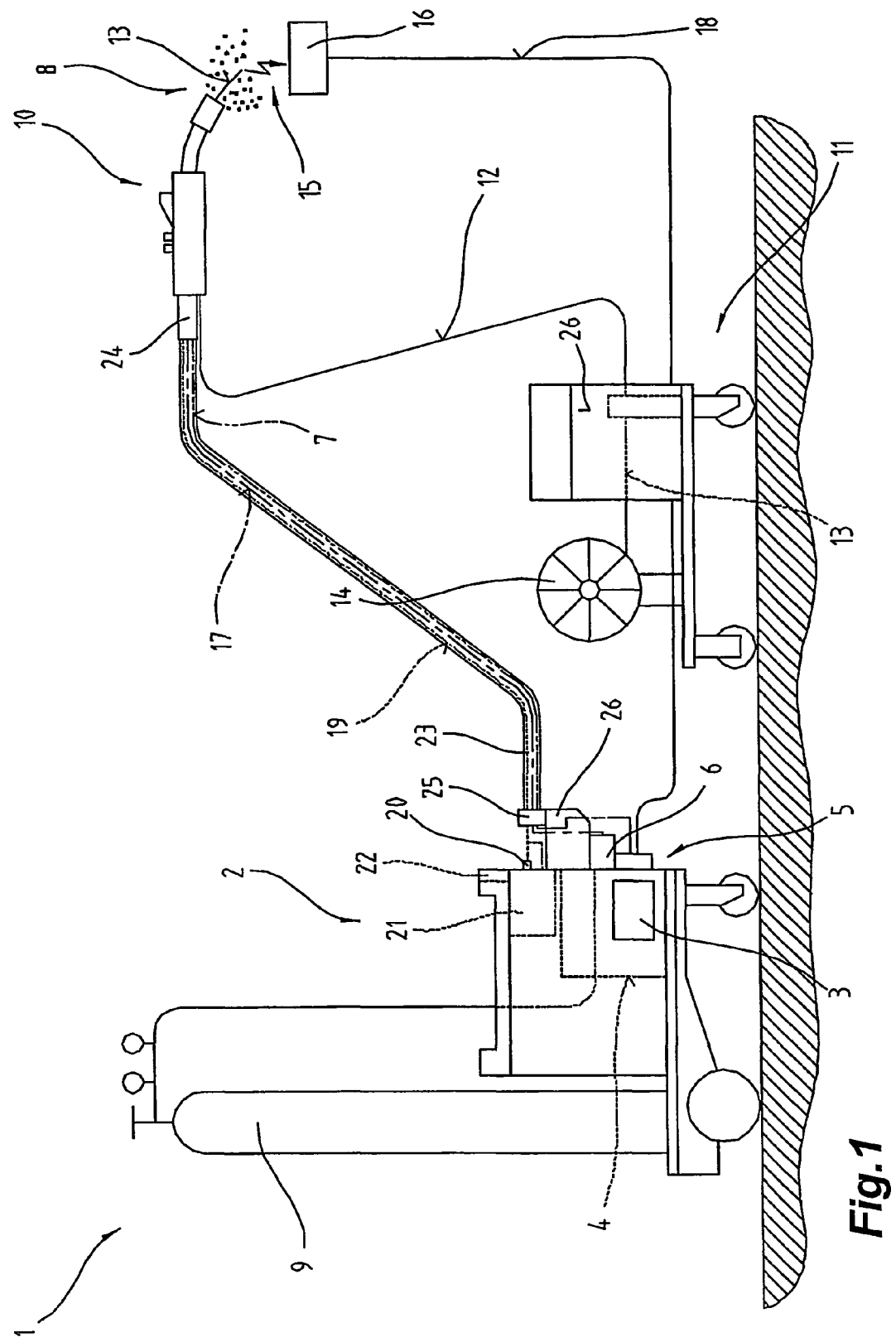
FIG. 1 is a schematic illustration of a welding apparatus.

FIG. 1 depicts a welding apparatus 1, or welding system, for various processes or methods such as, e.g., MIG/MAG welding or WIG/TIG welding, or electrode welding methods, double-wire/tandem welding methods, plasma or soldering methods etc.

The welding apparatus 1 comprises a power source 2 including a power element 3, a control device 4, and a switch member 5 associated with the power element 3 and control device 4, respectively. The switch member 5 and the control device 4 are connected to a control valve 6 arranged in a feed line 7 for a gas 8 and, in particular, a protective gas such as, for instance, carbon dioxide, helium or argon and the like, between a gas reservoir 9 and a welding torch 10 or torch.

In addition, a wire feeder 11, which is usually employed in MIG/MAG welding, can be controlled by the control device 4, whereby a filler material or welding wire 13 is fed from a feed drum 14 or wire coil into the region of the welding torch 10 via a feed line 12. It is, of course, possible to integrate the wire feeder 11 in the welding apparatus 1 and, in particular, its basic housing, as is known from the prior art, rather than designing the same as an accessory device as illustrated in FIG. 1. It is also feasible for the wire feeder 11 to supply the welding wire 13, or filler metal, to the process site outside the welding torch 10, to which end a non-consumable electrode is preferably arranged within the welding torch 10, as is usually the case with WIG/TIG welding.

The power required to build up an electric arc 15 between the electrode or welding wire 13, respectively, and a workpiece 16 is supplied from the power element 3 of the power source 2 to the welding torch 10, in particular electrode, via a welding line 17, wherein the workpiece 16 to be welded, which is formed of several parts, is likewise connected with the welding apparatus 1 and, in particular, power source 2 via a further welding line 18, thus enabling a power circuit for a process to build up over the electric arc 15, or a plasma jet formed.

To provide cooling of the welding torch 10, the welding torch 10 can be connected to a fluid reservoir, in particular a water reservoir 21, by a cooling circuit 19 via an interposed flow control 20, whereby the cooling circuit 19 and, in particular, a fluid pump used for the fluid contained in the water reservoir 21, is started as the welding torch 10 is put into operation, in order to effect cooling of the welding torch 10.

The welding apparatus 1 further comprises an input and/or output device 22, via which the most different welding parameters, operating modes or welding programs of the welding apparatus 1 can be set and called, respectively. In doing so, the welding parameters, operating modes or welding programs set via the input and/or output device 22 are transmitted to the control device 4, which subsequently controls the individual components of the welding system or welding apparatus 1 and/or predetermines the respective set values for controlling.

In the exemplary embodiment illustrated, the welding torch 10 is, furthermore, connected with the welding apparatus 1 or welding system via a hose pack 23. The hose pack 23 accommodates the individual lines from the welding apparatus 1 to the welding torch 10. The hose pack 23 is connected with the welding torch 10 via a coupling mechanism 24, whereas the individual lines arranged in the hose pack 23 are connected with the individual contacts of the welding apparatus 1 via connection sockets or plug-in connections. In order to ensure an appropriate strain relief of the hose pack 23, the hose pack 23 is connected with a housing 26, in particular the basic housing of the welding apparatus 1, via a strain relief means 25. It is, of course, also possible to use the coupling mechanism 24 for connection to the welding apparatus 1.

It should basically be noted that not all of the previously mentioned components have to be used or employed for the various welding methods or welding apparatus 1 such as, e.g., WIG devices or MIG/MAG apparatus or plasma devices. Thus, it is, for instance, possible to devise the welding torch 10 as an air-cooled welding torch 10.

Figure 2:
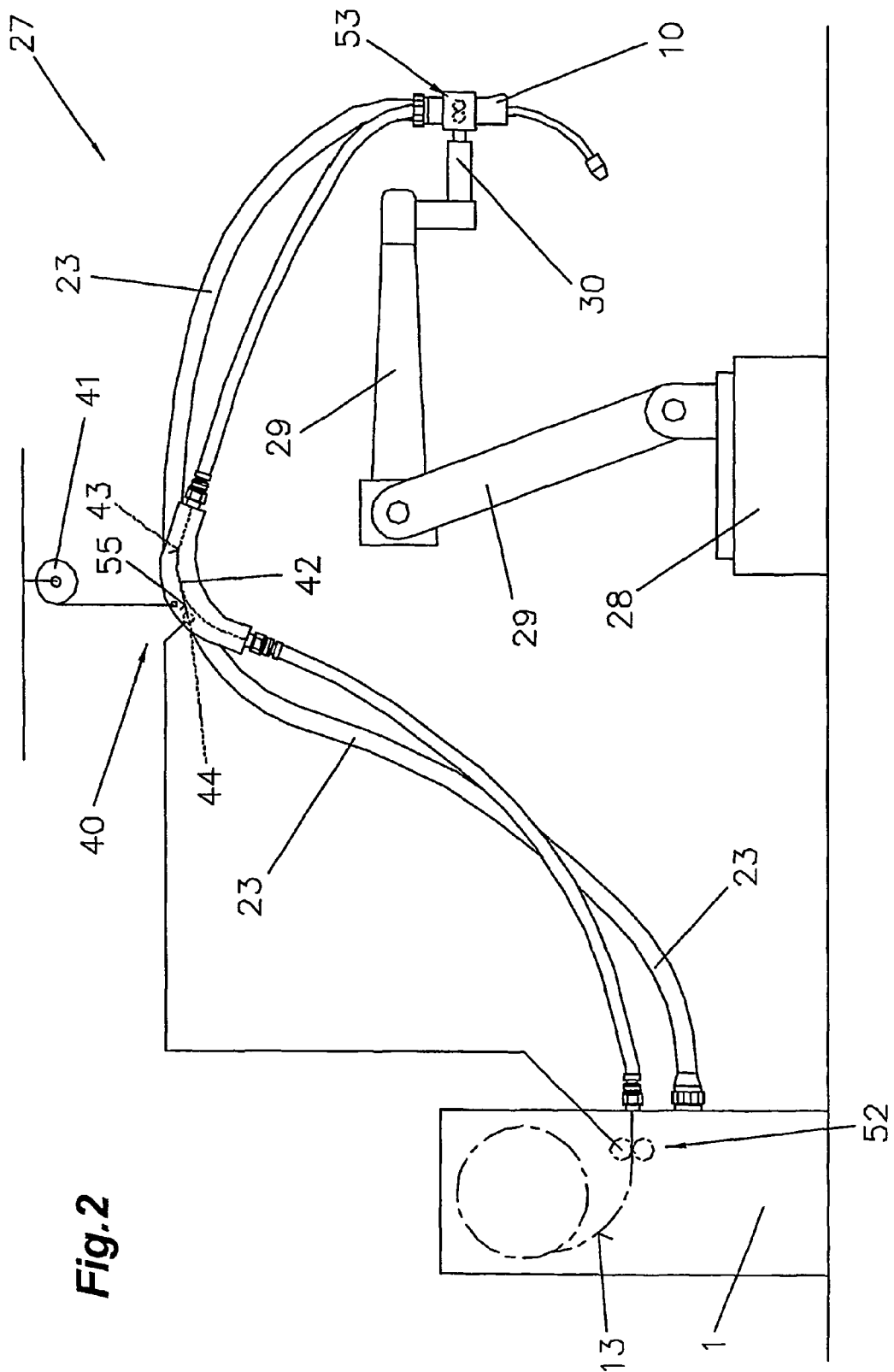
FIG. 2 is an elevational view of a robotic welding system.

FIG. 2 schematically illustrates the structure of a robotic welding system 27, in which a robot 28 comprises rotationally mounted robot arms 29 and the welding torch 10 is fastened to a manipulator 30.

In robotic welding systems 27 of this type, the welding apparatus 1 is placed outside the range of action of the robot 28, and the hose pack 23 used to connect the welding apparatus 1 with the welding torch 10 is laid to avoid interferences of the hose pack 23 with movements of the robot 28. In the exemplary embodiment illustrated, the setup for a cold-metal-transfer welding process, which is referred to as CMT process 31 in the following, is shown, in particular.

Figure 3:
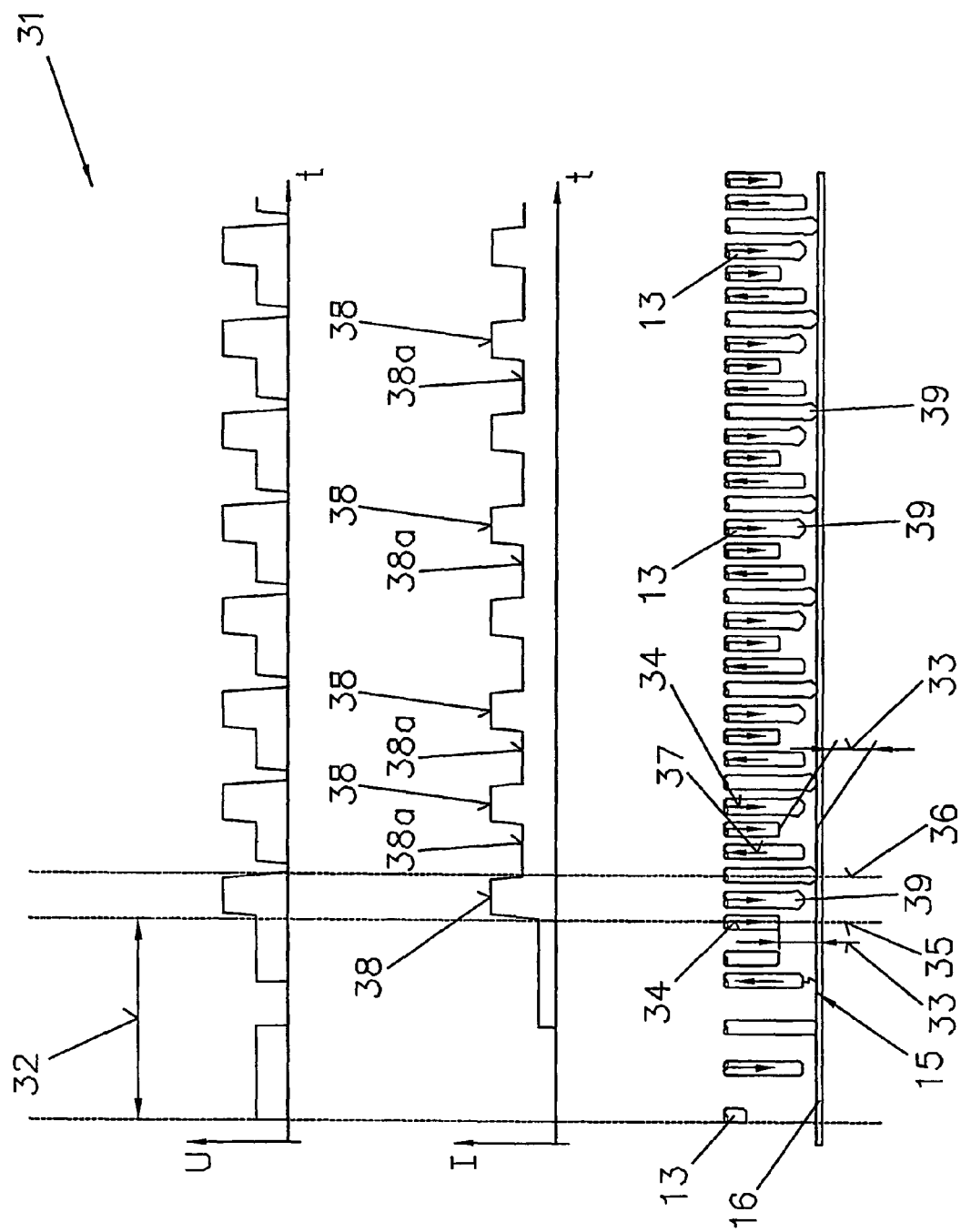
FIG. 3 is a process diagram of a cold-metal-transfer welding process.

In this respect, FIG. 3 schematically elucidates the time course of the CMT process 31. After an ignition phase 32 to generate the electric arc 15, the CMT process 31 is executed by the welding apparatus 1 and control device 4, and the individual components. During the CMT process 31, the welding wire 13 performs a movement from a particular starting position, i.e., a previously set, defined distance 33 of the welding wire 13 or welding wire end from the workpiece 16 or workpiece surface, respectively, in the direction towards the workpiece 16 (arrow 34), as is apparent from the diagram starting at time 35. The welding wire 13 is, thus, conveyed in the direction of the workpiece 16 until contacting the workpiece 16, i.e. the creation of a short-circuit, at time 36. After the creation of the short-circuit, the wire feed is reversed (arrow 37) to move the welding wire 13 away from the workpiece 16 as far as to the predefined distance 33, i.e., preferably, again back into the starting position, whereupon another reversal of the wire feed in the direction of the workpiece 16 along arrow 34 is effected, which sequence is continuously repeated. In order to ensure the transfer of material, i.e. the formation of a droplet or the incipient melting of the welding wire during the cold-metal-transfer welding process, the welding current 38, during the forward movement of the welding wire 13 in the direction of the workpiece 16 along arrow 34, is changed and, in particular, increased relative to a base current 38a, which is defined to maintain the electric arc 15 without any substantial incipient melting of the welding wire 13. Thus, the welding current 38 is controlled in a manner that an incipient melting of the welding wire 13, i.e., the formation of a droplet 39, takes place during the forward movement along arrow 34. Due to the immersion of the welding wire 13 into the melt bath (not illustrated), or the creation of a short-circuit, and the subsequently occurring rearward movement of the welding wire 13 in the sense of arrow 37, the formed droplet 39 or incipiently melted material is separated from the welding wire 13 without effecting an increase in the welding current 38. At the creation of a short-circuit, the current source is, thus, also controlled in a manner that no strong increase in the welding current 38 is effected to interrupt the short-circuit, as happens with usual welding current sources known from the prior art, so that as cool a welding process as possible is provided. To promote droplet detachment, also a pulse-like increase in the welding current 38 (not illustrated) is feasible, or the welding current 38 is lowered, or the current source deactivated, at the occurrence of the short-circuit or in the short-circuit phase, which will cause the droplet 39 to be pulled off the welding wire 13 during the rearward movement so as to allow the heat introduction into the workpiece 16 to be kept as low as possible.

Figure 4:
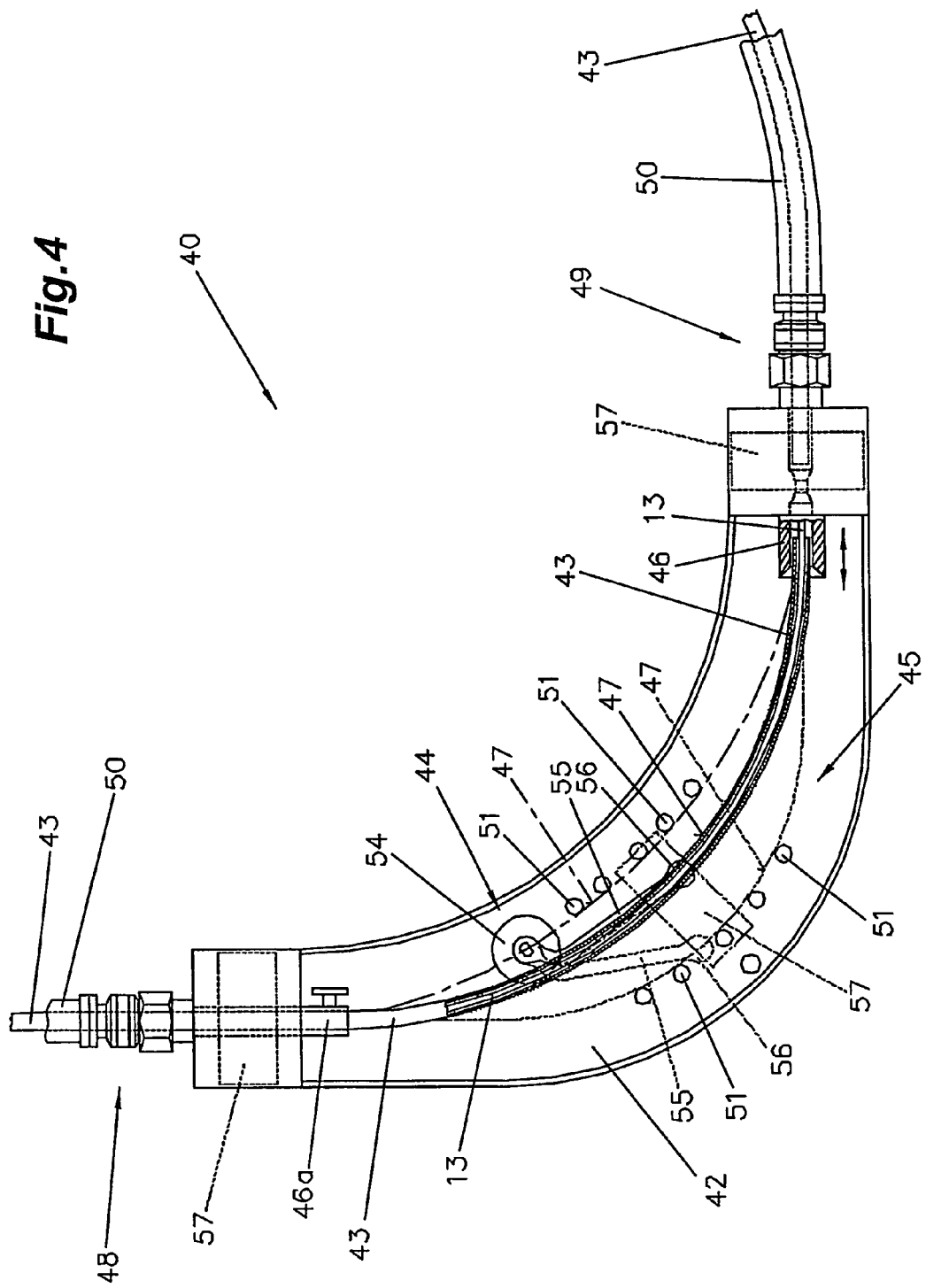
FIG. 4 is a schematic illustration of an angular storage.

Due to the special sequence of the CMT process 31, i.e., on account of the forward and rearward movements of the welding wire 13, and in order to ensure the safe execution of the process based on the different welding wire feeding directions, a welding wire storage device formed, in particular, by an angular storage 40 according to the invention, is arranged in the wire feed to accommodate excess welding wire 13 according to FIG. 4. It is, for instance, possible to fasten the angular storage 40 to a holding means arranged in a spaced-apart relationship from the robot 28, such as, for instance, a balance beam 41 as is schematically illustrated in FIG. 2. It is, of course, also possible to position the angular storage 40 on the robot 28, particularly on a robot arm 29.

The function of the angular storage 40 is to accommodate the excess welding wire 13 present in the welding wire feed system such that, for instance at a rearward movement, the welding wire 13 need no longer be pushed through the entire hose pack 23, or wire feed system, but this excess welding wire 13 need only be conveyed back into the angular storage 40 in order to be intermediately stored or buffered there until further feeding takes place. Friction losses will, thus, be reduced and a very good response behavior at a reversal of the direction of the welding wire feed will, hence, be obtained. The special, compact mode of construction enables the angular storage 40 to be arranged as close to the welding process as possible, i.e., in the vicinity of the welding torch 10, so as to provide a relatively short feeding path between the angular storage 40 and the welding torch 10.

The welding wire storage device and, in particular, angular storage 40 comprises a housing 42 or at least a base plate, with a wire core 43 guiding the welding wire 13 being arranged to lie freely, and a measuring means 44 for detecting the movement or deflection of the wire core 43 being provided. The wire core 43 surrounding the welding wire 13, in particular, is arcuately arranged in an unguided manner in a free space 45, whereby the wire core 43 is fixed in an end region of the housing 42, or on the ground plate, respectively, and displaceably mounted in a guide element 46 in the oppositely located end region. The guide element 46 can be formed by a simple slide tube in which the wire core 43 is freely movable in the longitudinal direction, as is schematically indicated by the double arrow. The fixation of the wire core 43 in a simple manner can be realized by a clamping system or screw connection as is schematically illustrated, to which end the wire core 43 is, for instance, guided by a further guide element 46a, in which a disc for fixing or clamping the wire core 43 is inserted. The welding wire 13 may, of course, extend in the angular storage 40 without wire core 43 while again following an arcuate course. Due to the arcuate course of the wire core 43, or the freely running welding wire 13, respectively, it is ensured that a preferred direction for the deflection movement is pregiven or defined and, hence, more or less welding wire 13 can be accommodated in the angular storage 40 by respectively increasing or decreasing a radius 47 of the arcuate extension of the wire core 43. With a smaller radius 47 as illustrated in FIG. 4 in broken lines, more welding wire 13 will be in the angular storage 40 than at a larger radius 47 as in accordance with the dot-and-dash line in FIG. 4. During the welding process, the amount of welding wire can be appropriately controlled by increasing or decreasing the radius 47. Moreover, the arcuate extension already causes a precurvature of the wire core 43 such that the resistance against changes in the radius will be reduced and as little force as possible will, thus, be required to change the radius 47.

In a preferred manner, two coupling mechanisms 48, 49 are arranged on the housing 42 of the angular storage 40, particularly in its end regions, wherein the wire core 43 guiding the welding wire 13, or the welding wire 13 itself, is arranged to lie freely or unguidedly between the coupling mechanisms 48, 49 so as to allow the welding wire 13 and the wire core 43, respectively, to deform within the free space 45 with little resistance. The coupling mechanisms 48, 49 are designed as quicklocks. The coupling mechanisms 48, 49 may serve to couple a wire guide hose 50 for the wire core 43 and the welding wire 13. In the exemplary embodiment illustrated, the welding wire 13 is guided independently of the hose pack 23, via its own wire guide hose 50, from the welding apparatus 1 to the angular storage 40 and, from there, to the welding torch 10. This offers the advantage that the hose pack 23 with the remaining lines can extend directly, i.e. without interruption, from the welding apparatus 1 to the welding torch 10, as is apparent from FIG. 2, whereas the angular storage 40 is incorporated in the wire feed.

In order to delimit the deflection of the wire core 43 with the welding wire 13 extending therein, i.e. the capacity of the angular storage 40, limit elements 51 can be arranged in the housing 42 of the angular storage 40. These are at least advantageous for the maximum deflection of the wire core 43, since it might otherwise happen that with too large a deflection, i.e., too small a radius 47, the wire core 43 is pushed out of the guide element 46 such that a perfect operation of the angular storage 40 is no longer safeguarded. It is, of course, also possible to arrange limit elements 51 for the minimum deflection of the wire core 43. To this end, it is advantageous if the wire core 43 is guided in one direction in order to prevent buckling or deflecting of the wire core 43 or welding wire 13. In this case, it is, for instance, possible to arrange two guide plates in parallel relationship with the wire core 43 arranged to lie between so as to enable a deflection movement in but one direction. In this case, the two guide plates are arranged so closely to each other that the wire core 43 fits in between and hardly any deflection in the direction of the guide plates is feasible.

A measuring means 44 is provided to allow the control of the filling level in the angular storage 40. Said measuring means 44 is preferably connected with the control device 4 or directly with a drive unit 52 provided in the welding apparatus 1, as is schematically illustrated in FIG. 2, whereas a further drive unit 53 arranged in the welding torch 10 can be operated independently. In this case, the drive unit 53 provided in the welding torch 10 performs the welding wire feed and, in particular, forward/rearward movement of the welding wire 13 for the CTM process 31 irrespectively of the other drive unit 52 provided in the welding apparatus 1, the control of the other drive unit 52 provided in the welding apparatus 1 being effected as a function of the filling level of the angular storage 40. Thus, a very rapid reaction time for the welding wire feed is ensured, since the drive unit 53 provided in the welding torch 10 need not take into account any control operations for the other drive unit 52 provided in the welding apparatus 1 and the safety of the process is, therefore, substantially enhanced. The separate operation sequences in the welding wire feed, thus, allow for the decoupling of the two drive units 52, 53.

In order enable the detection of the filling level of the angular storage 40, the measuring means 44 in the exemplary embodiment illustrated is, for instance, designed as an angular sensor 54, e.g. an incremental transmitter, a potentiometer or the like, which is connected with the wire core 43 via a lever 55 and a rotationally mounted clip 56, a so-called core clip. At a change in the radius 47 of the arcuately extending wire core 43 as is schematically indicated in FIG. 4 by dot-and-dash and broken lines, such a change can, therefore, be detected, whereupon a respective conversion of the pulses, or calculation of the filling level, will be effected. After this, the feeding speed of the drive unit 52 provided in the welding apparatus 1 can be reduced or increased in order to control the filling level in the angular storage 40 to a predetermined setpoint. The control of the filling level in the angular storage 40 can be realized in various ways.

It is, for instance, possible to perform a relative speed correction control using start and stop signals. To this end, the drive units 52 and 53 are started at a previously determined speed setpoint via a start signal so as to cause the welding wire 13 to be fed in the direction of the workpiece 16 with the electric arc 15 ignited. Deviations or drifts between the drive units 52, 53 are detected by the angular storage 40. The measuring means 44, in particular angular sensor 54, detects the radius 47 of the wire core 43, and an appropriate control is carried out as a function of the respective variation. As the buffer is filled, i.e., the radius 47 of the wire core 43 becomes smaller, a reduction in the speed of the so-called slave drive, in particular the drive unit 52 provided in the welding apparatus 1, is effected. If, on the other hand, the measuring means 44 indicates a reduction of the buffer, i.e., an increase in the radius 47, an increase in the speed of the slave drive will take place. This type of controlling provides a continuous deviation control, yet with the master drive, in particular the drive unit 53 provided in the welding torch 10, performing the wire feed during the welding process autonomously, i.e., without taking into consideration the behavior of the slave drive or buffer filling level. It is, thus, also possible for the master drive, in particular the drive unit 53 provided in the welding torch 10, to carry out a pulsed or forward/rearward feed of the welding wire 13 rather than a continuous forward feed of the welding wire 13.

Furthermore, the arrangement of the angular storage 40 allows for the execution of a wire feed slip recognition or wire feed monitoring of the drive units 52, 53. To this end, a control window for the wire feed is defined for the slave drive, i.e. the drive unit 52 provided in the welding apparatus 1. The control window can be automatically fixed or calculated by the control device 4 in accordance with the desired control speed setpoint, or the user determines an appropriate control window. The sequence, for instance, proceeds in a manner that a set control speed of 10 m/min is adjusted for the master drive, i.e., the drive unit 53 provided in the welding torch 10, with the control window for the slave drive being fixed at, for instance, 8 m/min to 12 m/min by the control device 4. Thus, a deviation control of the slave drive will only be effected within this range, i.e., the master drive operates at the previously determined control speed setpoint of, for instance 10 m/min while the slave drive is controlled to not exceed these limit values ranging between 8 m/min and 12 m/min for the supply of the welding wire 13. In order for a slip recognition or welding wire feed monitoring to be actually performed, it is merely necessary to monitor and evaluate the filling level of the angular storage 40. If the buffer is, in fact, filled or emptied, this will imply a wire feed error, since, due to the increase or reduction of the wire feed speed of the slave drive, a return of the filling level to a pregiven buffer state is no longer possible.

If, for instance, the buffer has been full for a particular period of time, e.g. 0.5 s, and the wire feeding speed of the slave drive has already been reduced to a minimum, the wire feed will be stopped, since the control device 4, or an evaluation device, is able to conclude from this that a wire feed problem has occurred in the region of the welding torch 10, namely, in particular, sticking of the welding wire 13 or slipping of the driving rollers of the drive unit 53. If, on the other hand, the buffer happens to be empty over a particular period of time and the wire feeding speed of the slave drive has already been set to a maximum, the wire feed, or system, will again be stopped, since then a problem has occurred at the other drive unit 52. The window control, thus, provides additional monitoring of the drive units 52, 53 without requiring additional components, while, at the same time, enabling an allocation of the error source.

It is, however, also possible to carry out a control of the absolute speed using no start-stop signals. In doing so, the speed of the drive unit 52 provided in the welding apparatus 1 is controlled as a function of the buffer value, i.e., the filling level of the angular storage 40. In the simplest case, the drive unit 52 is stopped at the "buffer full" state, whereas the drive unit 52 will be controlled with the maximum speed possible at the "buffer empty" state. Thus, a linear control characteristic is obtained, with the respective control of the drive unit 52 being performed as a function of the buffer state. With this type of control, it is not necessary to simultaneously trigger the two drive units 52, 53 via a start or stop signal when setting the system into operation. Nor is it necessary to provide a set value for the filling level of the buffer, since a continuous control is performed.

Positioning control without start-stop signals is also feasible, whereby an adjusted or predefined buffer value, particularly a mid-position, is controlled independently of the speed setpoint, to which end the drive unit 52 performs the control of the buffer condition and the drive unit 53 executes the welding wire feed for the welding process independently thereof.

It is, for instance, also possible to carry out the adjustment control of the filling level from the welding apparatus 1 only after a defined period of change in the filling level has elapsed, so that no continuous adaptation or approximation is required. This is possible due to the fact that excess welding wire 13 can be taken up in, or more welding wire 13 than supplied can be taken from, the angular storage 40 over a short time as a function of dimensioning. The only thing essential is that the drive unit 53 provided in the welding torch 10 is operated independently of the drive unit 52 provided in the welding apparatus 1, since thereby the optimum and safe operation of, for instance, a CMT process 31, is ensured.

In order to provide defined starting situations at the start of the welding system, a starting and/or final buffer value can be adjusted such that the respective control will be effected before or after every welding procedure. It is, for instance, advantageous that the buffer and, in particular, the filling level of the angular storage 40, is refilled after every welding procedure, so that sufficient welding wire 13 will be available for a new welding procedure, which welding wire will not have to be fed from the wire storage, i.e., feed drum 14 to the welding torch 10 but is rapidly made available by the angular storage 40.

It is, moreover, advantageous that the angular storage 40 is either locked or rendered inactive during the threading-in of the welding wire 13, i.e., that a mechanical clamping means capable of fixing the loose end of the wire core 43 for threading in is used for locking, whereas, at an inactivation, this is simply done by software. The control of the angular storage 40 is only activated after the thread-in procedure.

It is also possible to measure the angular storage 43 after the start of the welding system by appropriately controlling drive units 52, 53. This may, for instance, be realized in that the angular storage 40 is at first emptied and filled by a drive unit 52, 53, in particular drive unit 52. In doing so, a state determination can be effected via the motor current, i.e., the motor current is monitored by the drive unit 52 in a manner that, after having attained a defined level and the known feed, it can be determined that the buffer is filled or emptied, respectively. With such a mode of procedure, an incremental transmitter can be employed as a measuring means 44, in which case a calibration will have to be carried out in order to enable the position or control options to be automatically defined.

From the exemplary embodiment illustrated in FIG. 4, it is further apparent that the housing 42 carries a fastening element 57 to which the hose pack 23 is fastened. In a simple manner, the fastening element 57 may, for instance, be designed as a clamp in which the hose pack 23 is held. This fastening element 47 is, for instance, arranged on the opposite side of the housing 42, which includes the free space 45 in which the wire core 43 extends. It is thereby reached that the hose pack 23 is fastened to the rear side of the housing 42 so as to provide free access on its front side. In addition, this will ensure a compact construction of the welding wire storage device and a compact connection of the hose pack 23 with the wire guide hose 50.

In the exemplary embodiment illustrated, the wire core 43 for guiding the welding wire 13 is assembled of two sections, i.e. interrupted just once. The wire core 43 extends from the welding apparatus 1 as far as into the angular storage 40, the wire core 43 leads directly form the welding apparatus 1 as far as into the guide element 46, where it ends. To this end, the wire core 43 is fixed in the entry region of the angular storage 40 as already pointed out above, whereas the freely located end of the wire core 43 is arranged to be displaceable within the guide element 46. The angular storage 40 subsequently, for instance, contains a transition piece as schematically indicated, in which the welding wire 13 is conducted to the consecutively provided, further wire core 43, the latter wire core 43 extending as far as to the welding torch 10. The welding wire 13 can, thus, be automatically threaded in.

It is also possible that the wire core 43 is comprised of three or more parts, wherein a separate wire core 43 is arranged for each portion, i.e., the connection from the welding apparatus 1 to the angular storage 40, within the angular storage 40 itself, and from the angular storage 40 to the welding torch 10, as is illustrated in FIG. 7.

Figure 5:
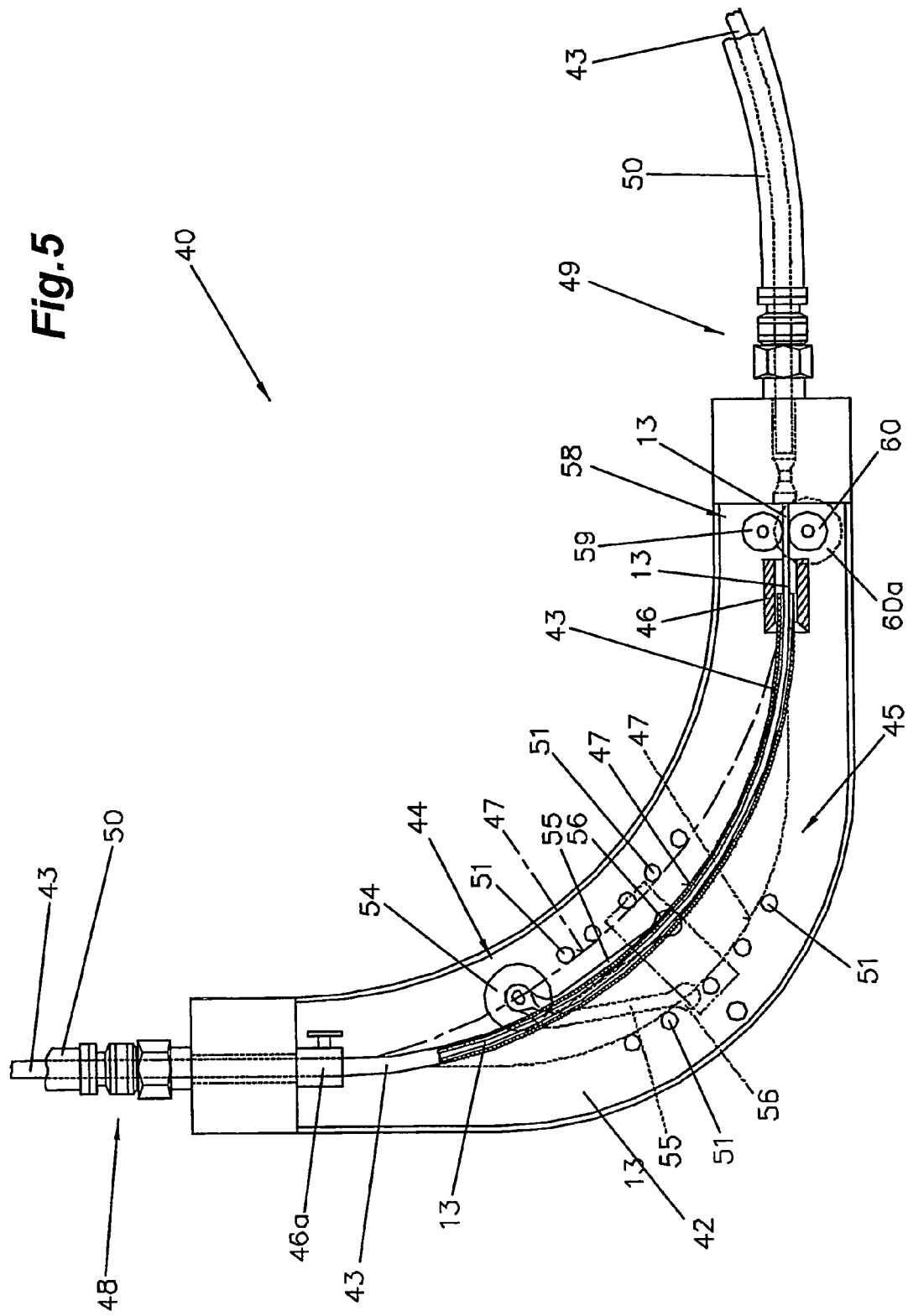
FIG. 5 is another exemplary embodiment of an angular storage in a simplified illustration.

FIG. 5 depicts a further exemplary embodiment of the angular storage 40. In this case, a wire actual value measuring system 58 is incorporated in the angular storage 40 to detect the actual value of the wire feeding speed. In a preferred manner, this wire actual value measuring system 58 is arranged between the guide element 46 and the coupling mechanism 49, since this will not cause any restriction of the wire core movement. The wire actual value measuring system 58 in a simple manner can be constructed in a manner that, for instance, two rollers 59, 60 are arranged with the welding wire 13 being fed between these rollers 59, 60 without any wire core 43. The rollers 59, 60 exert a defined pressure on the welding wire 13 so as to cause the rollers 59, 60 to be moved along with welding wire 13 at a welding wire transport. A transmitter 60*a* is connected with the rollers 59, 60, or at least one roller 59 or 60, whereby pulses or signals are generated, which means that the rollers 50, 60 are moved along by the welding wire 13 due to the welding wire 13 being fed via drive units 52, 53, so that, on account of the transmitter 60*a* coupled thereto, evaluations, in particular, as to the speed, feeding direction and whether feeding is performed at all, are feasible. Hence, it is subsequently possible to calculate or determine the actual speed and/or feeding direction of the welding wire by the control device 4 or a separate control device which may, for instance, be integrated in the angular storage 40. In a welding system, such a wire actual value measurement in most cases can only be performed within the welding apparatus 1 or within the wire feeder 11 due to the lack of space, whereby in those cases no conclusions as to the welding wire movement in the region of the welding torch 10 or within the welding wire feed system can usually be made because of the long distances. Since the angular storage 40 is arranged as close to the welding torch 10 as possible and sufficient space is available within the housing or on the base plate 42, such an application is easy to realize with little expenditure. It is, of course, also possible to perform the wire actual value measurement in other ways, for instance, by using a contactless measuring system, for which merely the respective structural adaptations will have to be made.

Figure 6:
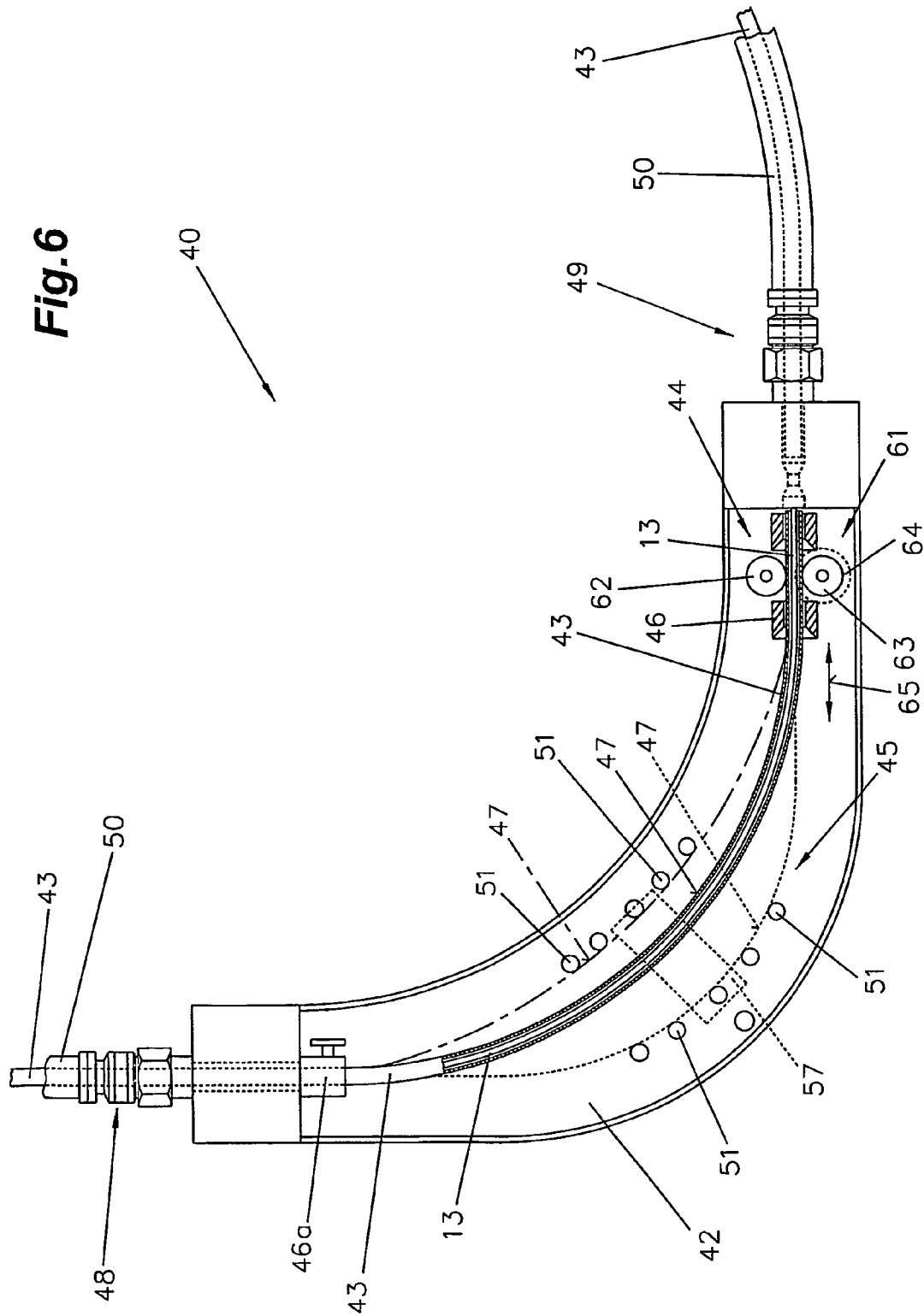
FIG. 6 is a further exemplary embodiment of an angular storage.

Furthermore, an exemplary embodiment using a novel wire core movement recognition system 61 is illustrated in FIG. 6.

The wire core movement recognition system 61 is formed in that the wire core 43 is arranged between two resiliently mounted rotating rollers 62, 63, which rotating rollers 62, 63 are pressed at the wire core 43 by a defined pressure. At the same time, the rotating rollers 62, 63 are coupled with an evaluation unit 64 such that the rotational movements of the rotating rollers 62, 63 will be detected. Via the evaluation unit 64, the rotational movements of the rotating rollers 62, 63 can, thus, be converted into path length changes. In case the radius of the arcuately extending wire core 43 changes, the end region of the wire core 43 will carry out a longitudinal movement in the sense of arrow 65, which will cause the rotating rollers 62, 63 to be moved along and the longitudinal movement or longitudinal displacement of the wire core 43 to be determined by the evaluation unit 64 on grounds of the shift of the rotating rollers 62, 63. From this, the contents stored in the angular storage 40 can be concluded so as to enable a control intervention in the wire feed for a deviation control to a pregiven setpoint, if necessary.

The detection of the rotational movements of the rotating rollers 62, 63 can be effected by any system known from the prior art, such as for instance, a potentiometer, an incremental transmitter, etc., the evaluation of the movement being preferably performed via a control device such as, for instance, a microprocessor control. It is, of course, possible to provide a separate control device (not illustrated) for the wire core movement recognition system 61, or to use the control device 4 of the welding apparatus 1 for evaluations.

Moreover, it is possible to directly couple the hose pack 23 to the angular storage 40, i.e., to an appropriately designed coupling mechanism 48, 49, with the individual lines being subsequently distributed within the angular storage 40. In this case, the welding wire 13 extends through the wire core 43 in the free space 45, whereas the other lines such as, for instance, the welding current cable, the cooling lines, the gas feed lines etc. are conducted around the free space 45. With such a solution, a distribution of the hose pack 23 virtually takes place in the angular storage 40.

The invention claimed is:

1. A welding wire storage device for a welding system comprising:
   (a) a housing having a free space, a first end region and a second end region opposite the first end region;
   (b) a wire core surrounding a welding wire and arcuately arranged in the housing to form a wire core radius in the housing and to lie freely in the free space of the housing, said wire core having a first end fixed in the first end region of the housing;
   (c) a measuring device for detecting deflection of the wire core, the measuring device being disposed within the housing and being able to detect the deflection of the wire core by measuring a change in the wire core radius;
   (d) a guide element on the second end region displaceably mounting the wire core;
   (e) a wire guide hose for the wire core, the wire guide hose comprising a first wire guide hose section and a second wire guide hose section; and
   (f) first and second coupling mechanisms arranged on the housing for connection with the wire guide hose;
   wherein the housing is arranged within the wire guide hose in that:
      the first coupling mechanism is arranged at the first end region of the housing and connects the housing with the first wire guide hose section; and
      the second coupling mechanism is arranged at the second end region of the housing and connects the housing with the second wire guide hose section.

2. The welding wire storage device according to claim 1, wherein the coupling mechanisms are each designed as a quick-lock.

3. The welding wire storage device according to claim 1, wherein elements for delimiting maximum deflection of the wire core are arranged in the housing.

4. The welding wire storage device according to claim 1, wherein an element for fastening a hose pack is arranged on an opposite side of the free space of the housing.

5. The welding wire storage device according to claim 1, wherein the housing is arranged between a welding apparatus or wire feeder and a welding torch, wherein a hose pack is arranged directly, without interruption, between the welding apparatus or wire feeder and the welding torch, and wherein the wire core is interrupted in the housing.

* * * * *